J. W. DONAHUE.
UNDERCUT SAW GUIDE.
APPLICATION FILED MAY 21, 1912.
1,054,517.
Patented Feb. 25, 1913.
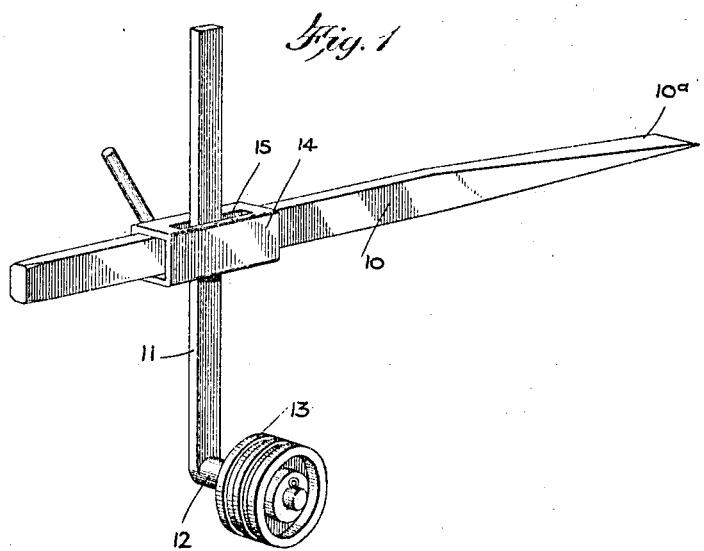
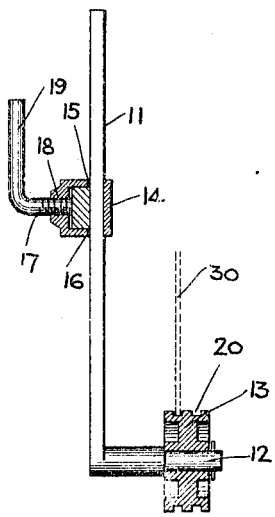
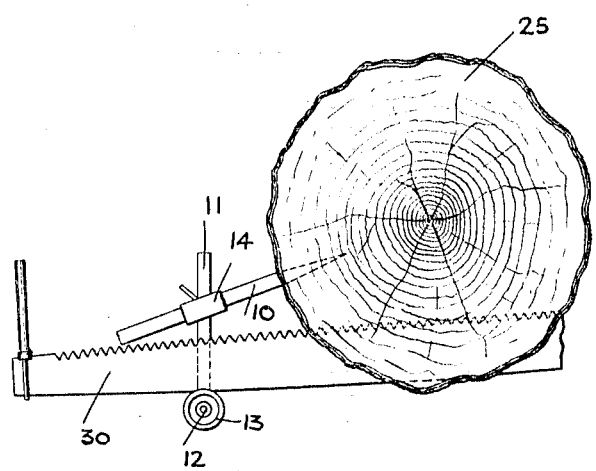
WITNESSES
INVENTOR
James W. Donahue
BY
ATTORNEYS

UNITED STATES PATENT OFFICE.

JAMES WILLIAM DONAHUE, OF PE ELL, WASHINGTON.

UNDERCUT-SAW GUIDE.

1,054,517.  Specification of Letters Patent.  Patented Feb. 25, 1913.

Application filed May 21, 1912. Serial No. 698,687.

*To all whom it may concern:*

Be it known that I, JAMES W. DONAHUE, a citizen of the United States, and a resident of Pe Ell, in the county of Lewis and State of Washington, have invented a new and Improved Undercut-Saw Guide, of which the following is a full, clear, and exact description.

My invention relates to saw guides adapted to so support the saw as to form a kerf at the under side of the log, with the saw inverted.

Devices of this character include generally a spike or dog to be driven into the side of the log, and a guide arm adjustable on the shank of the spike and carrying a friction roller forming a rest and guide for the inverted cross-cut saw.

An object of my invention is to provide a guide capable of such adjustments as to enable the saw to form a kerf in a complete circle around the log.

A further object of my invention is to provide for the various adjustments of the guide arm on the shank of the spike without forming holes or slots in the said shank, to weaken the same.

A further object of my invention is to construct the saw-guide of elements simple in form and possessing the maximum of strength, and by means of which the adjustments may be made with convenience and despatch.

The invention will be particularly explained in the specific description hereinafter to be given.

Reference is to be had to the accompanying drawings forming a part of this specification, in which similar characters of reference indicate corresponding parts in all the views.

Figure 1 is a perspective view of my improved saw guide; Fig. 2 is an elevational section; and Fig. 3 is a side elevation showing the device in use on a log, the view including a portion of a cross-cut saw in operation.

In forming the constructional embodiment of the invention as illustrated, the spike or dog 10 has a front sharpened end $10^a$ as usual, to be driven into the log 25, and the spike carries the saw-supporting arm 11, which is formed at its lower end with a lateral stud arm 12, that carries a friction roller 13 of any approved form.

In order that the guide arm and its roller may be supported adjustably on the shank without weakening either the shank or the arm by boring or slotting, I provide a non-circular sleeve 14, preferably rectangular, the shank of the spike 10 being also rectangular. The said sleeve 14 is formed with elongated slots 15, 16, in the two opposite sides and in line with each other, said slots being of greater length than the width of the guide arm 11, so as to receive the same in a position either perpendicular to the sleeve, or at various angles, as will be readily understood. The bore or interior of the sleeve 14 is of a size in a direction transverse to the direction of the two slots 15, 16, that the said sleeve accommodates both the shank of the spike 10 and the arm 11. A further adjustment of the arm 11 is possible in that the said arm may be inserted lengthwise in the sleeve 14, so that the sleeve and the shank of the spike will range lengthwise of each other in parallel planes.

In order to bind the sleeve at any desired point along the shank of the spike, and also in order to bind the arm 11 at any given adjustment, a set screw 17 is provided, which takes into a threaded hole 18 in one side face of the sleeve 14, the said screw being bent laterally to form a lever handle 19. The saw 30 rests with its back edge in one or another of the annular grooves 20 with which the friction roller 13 is usually provided in its perimeter.

It will be obvious that the arm 11 may be inserted in the slots 15, 16, from the under side so that the roller 13 will be below the spike 10, or the said arm may be inserted from the upper side of the sleeve, passing from the slot 15 to the slot 16, whereby the roller 13 will be above the spike, and whether the arm be inserted from the top or bottom of the sleeve it is capable of the angular adjustment relatively to the length of the spike, and these various adjustments, coupled with the provision for inserting the saw-guide arm endwise of the latter, enables the operator to provide a support for the saw in such a multiplicity of positions that a kerf may be produced describing a complete circle around a log. It will furthermore be seen that the adjustments are effected without slotting, perforating, or otherwise weakening either the spike or the guide arm.

Having thus described my invention, I claim as new, and desire to secure by Letters Patent,—

An undercut saw guide, comprising a spike adapted to be driven into a log, an element slidably fitting the shank of the spike and formed with oblong, alined slots, an arm carrying a saw-guiding member, said arm being accommodated in the said slots with one side lying against the interior side surface of the element in which the slots are formed, the arm furthermore being rockable in the slots at various angles to the vertical, and means for binding the said arm against the mentioned interior surface.

In testimony whereof I have signed my name to this specification in the presence of two subscribing witnesses.

JAMES WILLIAM DONAHUE.

Witnesses:
FREDERIC W. DAMITZ,
CHARLES M. W----